United States Patent [19]
Witt a.k.a. Witte

[11] Patent Number: 5,549,812
[45] Date of Patent: Aug. 27, 1996

[54] PROCESS AND APPARATUS FOR PROCESSING INDUSTRIAL WASTE WATER BY ELECTROLYSIS

[75] Inventor: Willi Witt a.k.a. Witte, Gevelsberg, Germany

[73] Assignee: WT Wassertechnologie GmbH, Wuppertal, Germany

[21] Appl. No.: 407,323

[22] Filed: Mar. 20, 1995

[30] Foreign Application Priority Data

Mar. 26, 1994 [DE] Germany .................. 44 10 658.0

[51] Int. Cl.⁶ .................. C02F 1/463; C02F 1/461
[52] U.S. Cl. .................. 205/744; 205/751; 205/755; 204/228; 204/229; 204/267; 204/269; 204/275; 204/276
[58] Field of Search .................. 204/149, 152, 204/228, 229, 275, 276, 267, 269; 205/744, 751, 755

[56] References Cited

U.S. PATENT DOCUMENTS

| | | | |
|---|---|---|---|
| 3,893,900 | 7/1975 | Teshima et al. | 204/268 |
| 3,926,754 | 12/1975 | Lee | 204/152 |
| 4,140,609 | 2/1979 | Zucker | 204/149 |
| 4,439,290 | 3/1984 | Marfurt et al. | 204/149 |
| 4,770,755 | 9/1988 | Valanti et al. | 204/225 |
| 4,872,959 | 10/1989 | Herbst et al. | 204/109 |

FOREIGN PATENT DOCUMENTS 3641365  7/1989  Germany .

*Primary Examiner*—John Niebling
*Assistant Examiner*—Arun S. Phasge
*Attorney, Agent, or Firm*—Herbert Dubno

[57] ABSTRACT

Electrolysis of water is effected while the water flow is pulsed utilizing pulse direct current in an electrolyzer having a medium flow between pairs of electrodes and a meandering flow from electrode pair to electrode pair, treating waste water and producing a flocculate which is removed in a stilling or settling tank cascade.

10 Claims, 4 Drawing Sheets

PROCESS AND APPARATUS FOR PROCESSING INDUSTRIAL WASTE WATER BY ELECTROLYSIS

FIELD OF THE INVENTION

The present invention relates to a process for the treatment of industrial waste water by electrolysis and especially for the cleaning of industrial waste water recovered, for example, from industrial boilers or otherwise containing contaminants, utilizing an electrolysis process to break down and chemically react and effect flotation of contaminants. The invention also relates to an apparatus for carrying out the process and especially to an electrolysis reactor for that purpose.

BACKGROUND OF THE INVENTION

In German Patent Document DE 36 41 365 C2, an apparatus for the cleaning and treatment of contaminated water is described which utilizes electroflotation. In electroflotation, iron and aluminum electrodes are consumed by the electrolysis, i.e. are sacrificial electrodes which are used to treat the waste water passing between sets of metal plates forming a cascade of electrodes.

The alternating iron and aluminum plates can achieve flotation in a wide pH range without the addition of chemicals and can bring about sufficient clarification or cleaning of the water.

During the electroflotation step, metals are oxidized in the waste water and can form precipitates, emulsions can be broken and oil components converted to a foam phase. In practice, fine gas bubbles are produced by an electrolytic action by the electrodes, which form anodes and cathodes, in the waste water which constitutes an electrolyte. Liberated oxygen serves to oxidize substances in the waste water. The release of iron and aluminum into the solutions provides flocculating agents which cause contaminants to fall to the bottom while gas bubbles may produce a foam bed at the top. A clean phase forms between the upper foam bed and the heavier dirty component at the bottom.

Prior processes for electroflotation operate with continuous direct current, the electrodes being dissolved in conjunction with the electrolysis.

OBJECTS OF THE INVENTION

It is the principal object of the present invention to provide a process for processing or treating industrial waste water which can improve the efficiency of elimination of noxious and toxic substances, which will have improved electrode life and which is characterized by reduced energy consumption.

Another object of the invention is to provide an improved process of the type described which is more efficient in all aspects and is free from drawbacks of prior art systems.

Still another object of the invention is to provide an improved apparatus for carrying out the process of the invention.

SUMMARY OF THE INVENTION

These objects and others which will become apparent hereinafter are attained in a process for treating an industrial waste water which comprises the steps of:

(a) passing an industrial waste water containing contaminants susceptible to flocculation and precipitation upon electrolysis of the waste water between electrodes;

(b) subjecting waste water between the electrodes to electrolysis by energizing the electrodes with direct-current pulses, thereby breaking down and chemically altering contaminants in the electrolyzed water to form a sedimentatable flocculate therein; and (c) separating the flocculate from a cleaned water.

According to the invention, therefore, rather than energize the electrodes with continuous direct current, the electrodes are energized or activated with DC pulses.

By applying the direct current as a pulsed direct current, I have been able to form microscopically small gas bubbles of hydrogen and oxygen as a consequence of the electrolytic splitting of water which has been found to improve the oxidation of noxious and toxic substances therein. Best results are obtained when the electrodes are energized with direct current pulses at a repetition frequency of up to 800 Hz but preferably at least 500 Hz.

The results obtained can be further improved if, in addition to the pulsing of the direct current, the water flow between the electrodes is pulsed. More particularly, the waste water flow is accelerated pulsewise into the electrolytic reactor and between the electrode plates and preferably the water between the plates is positively guided on the electrodes at an elevated flow velocity, guidance being effected in a meandering pattern between each pair of electrodes.

The pulse-like acceleration of the waste water flow can be effected by means of a pump at the inlet to the electrolysis reactor. Relatively short high velocity flow pulses can be obtained in this manner.

Surprisingly, the pulsed flow appears to increase the friction of the water against the plates along the surfaces of the electrodes so that high velocity waste water can entrain any gas bubbles and substances and prevent the formation of deposits which may interfere with the flow of waste water between the electrodes and might cause fluctuation in the electrical potential between the electrodes.

I have found, moreover, that as a result of the combination of pulsed flow and pulsed DC energization, the efficiency of the electrolytic reactor is greatly increased, the build up of insulating deposits on the electrode surfaces is avoided and the increase in electrical energy which must be applied to overcome the insulating effect of such deposits is unnecessary.

In addition, the pulsing of the flow of the water between the electrodes can so elevate the speed during the high velocity portions of the flow that the bubbles which are produced at the electrodes are vigorously torn away from the electrodes surfaces and thus remain microscopically small without growing into larger bubbles. The result is a uniform generation of fine gas bubbles which promote the reaction described. More particularly, the chemical reaction between the ultrafine bubbles and organic contaminants is promoted and the contaminants are thus broken down more readily and converted into flocculates and precipitable substances which can separate out of the water more efficiently.

The positive guidance of the water flow over the electrodes insures a uniform flushing of all of the surfaces of the anode and cathode plates in contact with the water. The electrolysis reactor can be closed and this, in conjunction with the high flow rate of the water over the surfaces of the anode and cathode plates, prevents undesirably rapid separation of the gas and water phases and accumulation of gas pockets on the electrode surfaces. Contact between the gas bubbles and the noxious components and the contact time of the bubbles with the aqueous phase can be greatly increased.

According to a feature of the invention, the electrical conductivity of the waste water passing between the electrodes can be measured and the direct current voltage applied to individual electrode portions can be controlled to maintain a substantially constant current density over the entire electrode system. This current density is optimally about 5 amperes/cm$^2$.

In practice, at the inlet to the electrolysis reactor a lower voltage level will automatically be applied while higher voltage levels will ordinarily be applied progressive toward the outlet to maintain the substantially constant current density. This insures optimal energy utilization and, in addition, uniform utilization of the sacrificial electrodes so that the electrodes last longer, i.e. overall energy consumption is reduced and overall electrode life is increased.

Indeed, the increase in efficiency is such that the water treatment process of the invention can be used for large scale cleaning of industrial waters without the need to add chemicals to stabilize the floc which is formed or to reduce foam formation.

The contaminants which can be eliminated can include heavy metals, dyes, oils, fats, solvents, salts, etc.

The invention also comprises an apparatus for treating waste water and which comprises:

an electrolysis reactor having spaced apart electrodes;

means for passing an industrial waste water containing contaminants susceptible to precipitation upon electrolysis of the waste water through the reactor and between the electrodes with direct-current pulses to subject waste water between the electrodes to electrolysis, thereby breaking down and chemically altering contaminants in the electrolyzed water thereby forming a sedimentable flocculate in the electrolyzed water; and means connected with the reactor for separating the flocculate forming cleaned water, the electrodes in the reactor being constituted as parallel plates spaced apart and defining a meandering waste water guide path from gap to gap between successive plates, the plates being formed with guide ducts between parallel surfaces of the elected plates so that waste water is guided positively in a meandering path over the plate surfaces.

According to the invention, therefore, the electrolysis reactor has electrode plates disposed parallel to one another with a predetermined (i.e. a given) spacing in horizontal or vertical alignment and forming a meandering guide path between pairs of plates. According to the invention, the meandering guide ducts formed between parallel surfaces of the plates can be defined by ribs or strips on one plate against which a flat surface of the other plate may bear. Instead of a meandering path, any other labyrinth-like path can be provided between pairs of plates so that the liquid flow not only meanders between pairs of plates in cascade, but on the surfaces of the plates as well.

The positive guidance of the liquid on the plates, of course, can reduce the flow cross section to increase the velocity and, in conjunction with a pulsing of the water flow, can insure especially high rates of acceleration of the liquid through the narrower cross sections formed by the guide ducts between each pair of plates.

The principle is effective with both the horizontal and the vertical constructions.

According to another feature of the invention, the means downstream of the electrolysis reactor for separating the clean water from the contaminants, includes a multistage settling or instilling device with two or more series-connected flocculation tanks. A trickling system is associated with a first of these tanks for limiting the build up of the foam and causing contaminants in the foam to settle in the lower portion of the flocculation tanks. The waste water path through the multistage settling system and the flocculation tanks thereof with an inlet and outlet coupled with circulation in the tanks results in an optimum macroflocculation in the settling stage. Because of the trickling system in the first flocculation tank undesirable foam development on the surface of the water is prevented and clean and inexpensive solids recovery is possible.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
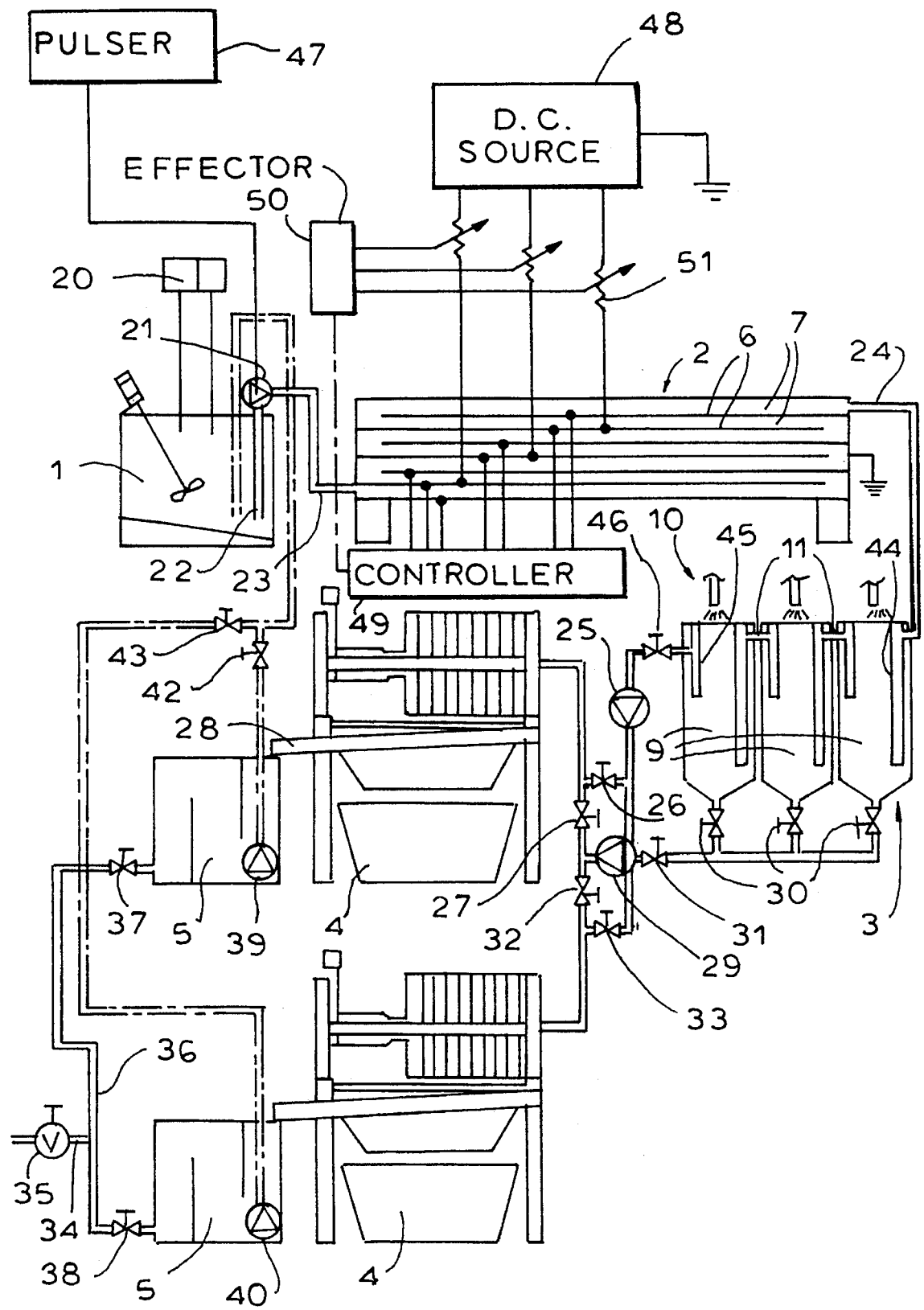
FIG. 1 is a flow diagram illustrating an apparatus for practicing the process of the invention.

From FIG. 1 it will be apparent that an apparatus for processing industrial waste water, e.g. waste water from a cooling tower of a power plant, waste water from a cooling system of a metallurgical plant, boiler water or the like can comprise a neutralization tank 1 in which the pH of the water introduced into this tank can be continuously measured and the waste water neutralized, if necessary, by the addition of acid or base. The pH measuring and neutralization system has been shown generally at 20 in FIG. 1.

From the neutralization tank 1, the water can be displaced by a pump 21 via a riser 22 and a pipe 23 to the inlet of an electrolysis reactor 2. From the outlet a pipe 24 conducts the electrolyzed water to a stilling or settling unit 3 from which the clean water is withdrawn from an intermediate location between the tops and bottoms of the flocculation tanks of the settling unit 3 to be displaced by a pump 25 via a valve 26, valve 27 being closed, to a chamber filter press 4 serving for the final cleaning of the clear water. From this filter press via a trough 28, the clean water flows to a clean water tank 5.

Similarly, a pump 29 can displace the sludge from the bottom of the flocculation tanks 9 via valves 30 and 31 and open valve 32, the valve 33 being closed, to a second filter press 4 from which the clean water flows to another clean water tank 5. By use of the valves 26, 27, 32, 33, the filter presses can be interchanged as to function, i.e. the pumps 25 and 29 can feed the lower filter press and the upper filter press, respectively. The clean water can be carried off via a pipe 34 and a valve 35 and the tanks 5 can be interconnected by a pipe 36 and valves 37 and 38.

As shown in dot dash lines, pumps 39 and 40 can displace portions of the clean water as rinsing water to the tank 1 via the valves 42 and 43.

The flotation tanks 9, described as to functioning below, are connected in cascade and thus at the inlet side of each tank, a down, 44 is provided to introduce the water at a lower portion of the tank. A riser 45 opens at a midportion of the tank so that the clean water is drawn from between any foam on top of the tank and any accumulated sediment at the bottom of the tank to pass via the connection 11 to the downcomer of the next tank or the pump 25 via a valve 46.

More particularly, the neutralized waste water is forced by the pump 21 into the electrolysis reactor where it passes between DC energized electrodes 6 from the anode and cathode plates which are disposed parallel to one another and are electrically insulated from one another.

Figure 2:
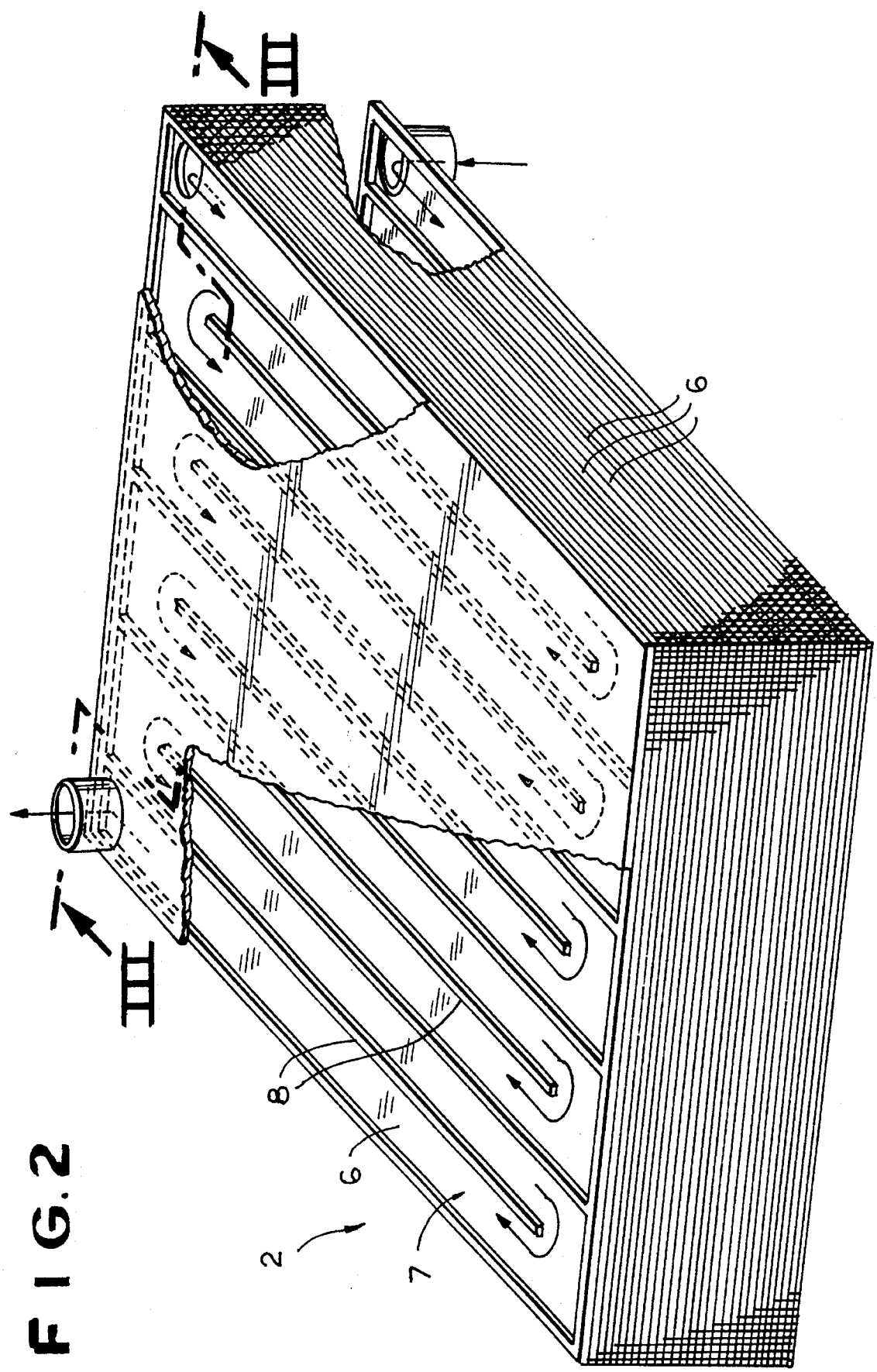
FIG. 2 is a perspective view, partly broken away, showing an electrolysis reactor of the horizontal type for use in the apparatus of FIG. 1.

The plates have a predetermined spacing between them and in the space between them form meandering ducts illustrated as guide ducts 7 in FIG. 2.

Thus the meandering flow takes place between each pair of plates (FIG. 2) and from space to space between successive plates in the vertical direction in the case of the horizontal electrolysis reactor or in a horizontal direction in the case of a vertical reactor.

Figure 5:
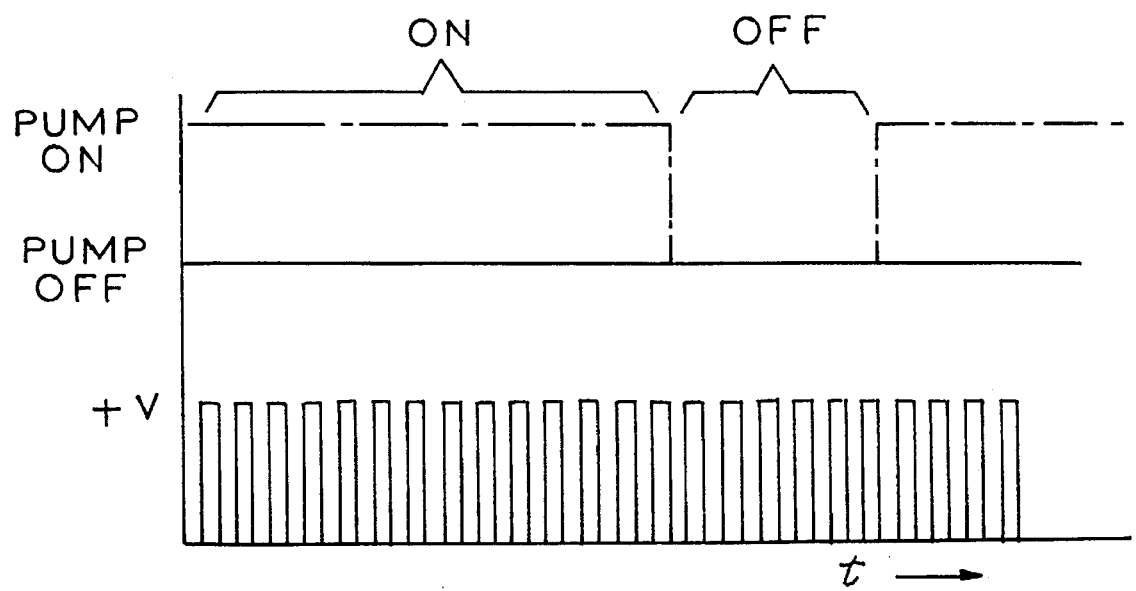
FIG. 5 is a diagram illustrating aspects of the invention.

As can be seen from FIG. 1, the pump 21 may be provided with a pulsed energization source 47 which can accelerate the flow through the electrolysis reactor in a pulse followed by a period of rest. The pump 21 can thus be turned on for the ON period shown in the upper graph of FIG. 5 and off for the OFF period in a pulsating manner. At the same time, the DC source 48 energizing the plates 6 can be a pulsed source delivering a direct current voltage +V (see the lower graph of FIG. 5) at a predetermined pulse repetition frequency between 500 and 800 Hz to the plates.

According to the invention, moreover, the conductivity between the plates is measured by a controller 49 which can operate servomotors or other effects represented at 50 to control voltage level device 51 controlling the potential applied to the plates at different locations along the path of the water so that the current density through the entire electrolyzer remains approximately constant.

Figure 3:
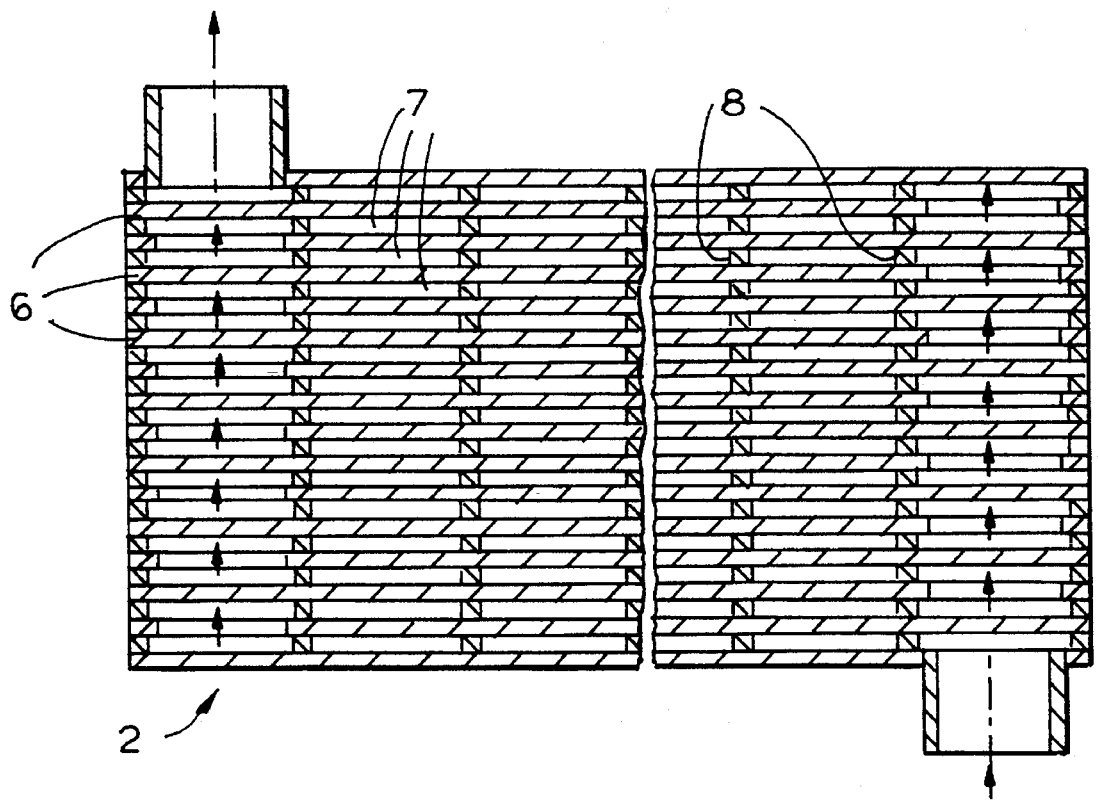
FIG. 3 is a vertical section through the horizontal reactor taken generally along the line III—III of FIG. 2.
Figure 4:
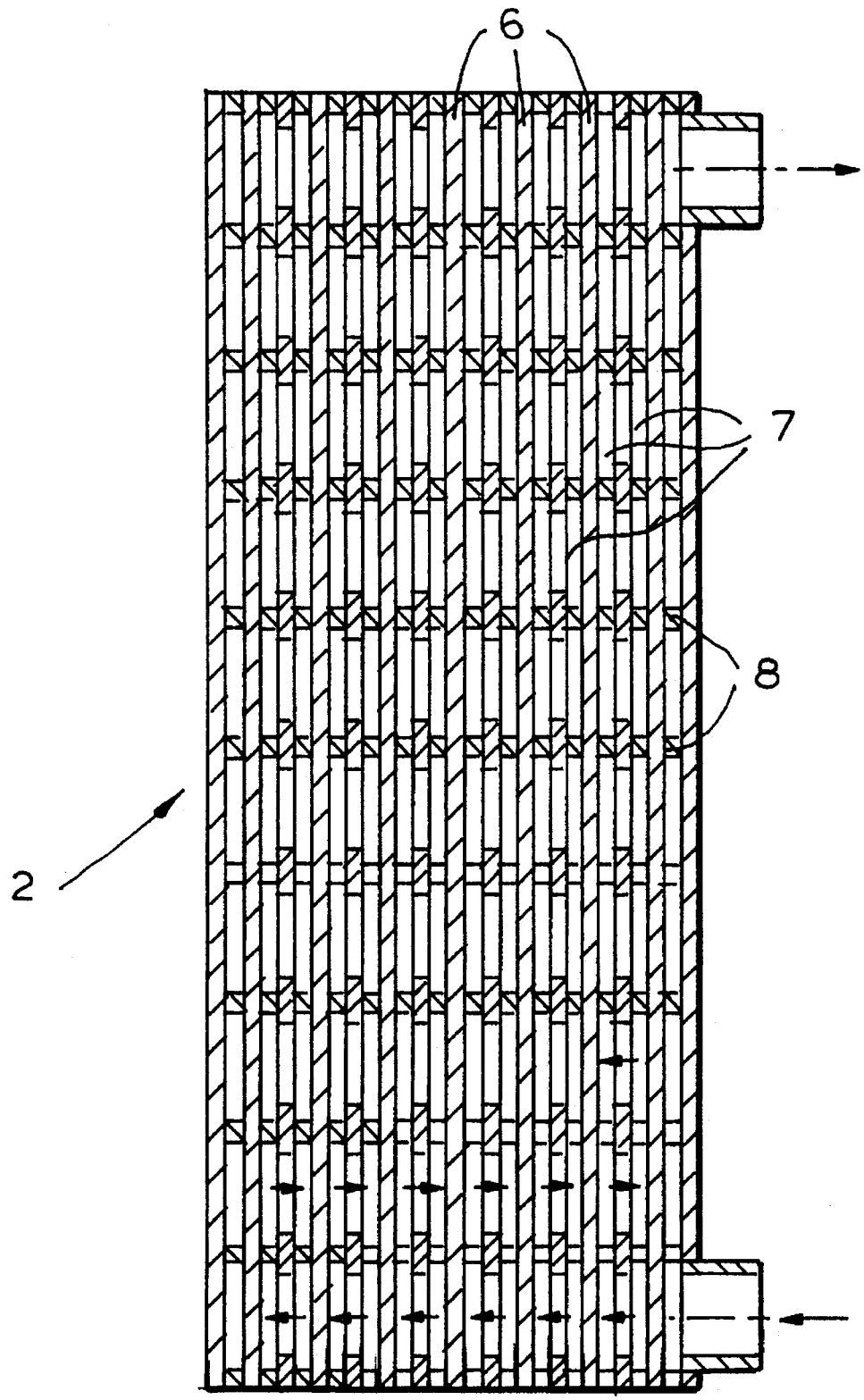
FIG. 4 is a section corresponding to FIG. 3 but through a reactor of the vertical type.

On one side of a pair of electrode plates defining meandering guide ducts, insulating guide strips 8 can be provided (FIG. 2) and the opposite plate can rest against these strips. Such meandering guide ducts can also be formed on the outside walls of the meandering guide ducts and the outer plates 6. In FIG. 3 the meandering paths between the plates are horizontal and the paths between sets of plates are vertical whereas in FIG. 4 the meandering paths between each pair of plates are vertical while the sets are in a cascade in which the flow meanders horizontally from set to set.

The electrolysis in the reactor 2 breaks down the contaminants and induces chemical reactions which produce a precipitate and flocculate which flows via line 24 to the still unit 3 in which solids are settled out of the resulting suspension in the three series-connected flocculation tanks.

Associated with the latter is a trickling system 10 to provide optimal macro flocculation while avoiding foam on the surface.

The clean phase is then filtered in the upper filter press 4 with a comparatively high throughput while the contaminated sludge is fed to the lower filter press 4 at a small output.

I claim:

1. A process for processing an industrial waste water by electrolysis, according to which the waste water is conducted past DC-activated electrodes in an electrolysis reactor, said process comprising the steps of:

(a) passing an industrial waste water containing contaminants susceptible to flocculation and precipitation upon electrolysis of the waste water between electrodes having parallel plate surfaces defining constricted flow-passages between them;

(b) subjecting waste water between said electrodes to electrolysis by energizing said electrodes with direct-current pulses, thereby breaking down and chemically altering contaminants in the electrolyzed water to form a sedimentatable flocculate therein;

(c) pulsingly accelerating and decelerating flow of said waste water between Said parallel plate surfaces to periodically forcibly increase flow velocity of the waste Water between said surfaces during the electrolysis; and (d) separating said flocculate from a cleaned water.

2. The process defined in claim 1 wherein said electrodes are energized with direct current pulses of a pulse repetition frequency of up to 800 Hz.

3. The process defined in claim 2 wherein said pulse repetition frequency is at least 100 Hz.

4. The process defined in claim 3 wherein said pulse repetition frequency is between about 500 Hz and 800 Hz.

5. The process defined in claim 1 further comprising the step of positively guiding the water in a meandering pattern along said electrodes.

6. The process defined in claim 1 further comprising the step of measuring electrical conductivity through the waste water between said electrodes and regulating the direct current voltage applied to sections of said electrodes in dependence upon the measured conductivity to maintain a substantially uniform current density through all of said sections.

7. An apparatus for processing an industrial waste water comprising:

an electrolysis reactor having spaced apart electrodes having parallel plate surfaces defining constricted flow-passages between them;

means for passing an industrial waste water containing contaminants susceptible to precipitation upon electrolysis of the waste water through said reactor and between said electrodes with direct-current pulses to subject waste water between said electrodes to electrolysis, thereby breaking down and chemically altering contaminants in the electrolyzed water thereby forming a sedimentable flocculate in the electrolyzed water;

means for pulsingly accelerating and decelerating flow of said waste water between said parallel plate surfaces to periodically forcibly increase flow velocity of the waste water between said surfaces during the electrolysis; and means connected with said reactor for separating said flocculate forming cleaned water, said electrodes in said reactor being constituted as parallel plates spaced apart and defining a meandering waste water guide path from gap to gap between successive plates, said plates being formed with guide ducts between parallel surfaces of the elected plates so that waste water is guided positively in a meandering path over the plate surfaces.

8. The apparatus defined in claim 7 wherein one side of each of the electrode plates is formed with guide strips defining a meandering path over the plate surfaces, another plate resting on said guide strips.

9. The apparatus defined in claim 8 wherein said means for separating said flocculate from said cleaned water comprising a multistage sedimenting device having at least two series connected flocculation tanks and a trickling system for trickling liquid onto the contents of a first of the flocculation tanks downstream of said reactor.

10. The apparatus defined in claim 9 wherein said flocculation tanks are interconnected at a predetermined tank height overflow of said clean water.

* * * * *